J. F. LINDLEY.
PULPING MACHINE.
APPLICATION FILED APR. 19, 1919.
1,408,303.
Patented Feb. 28, 1922.
3 SHEETS—SHEET 1.
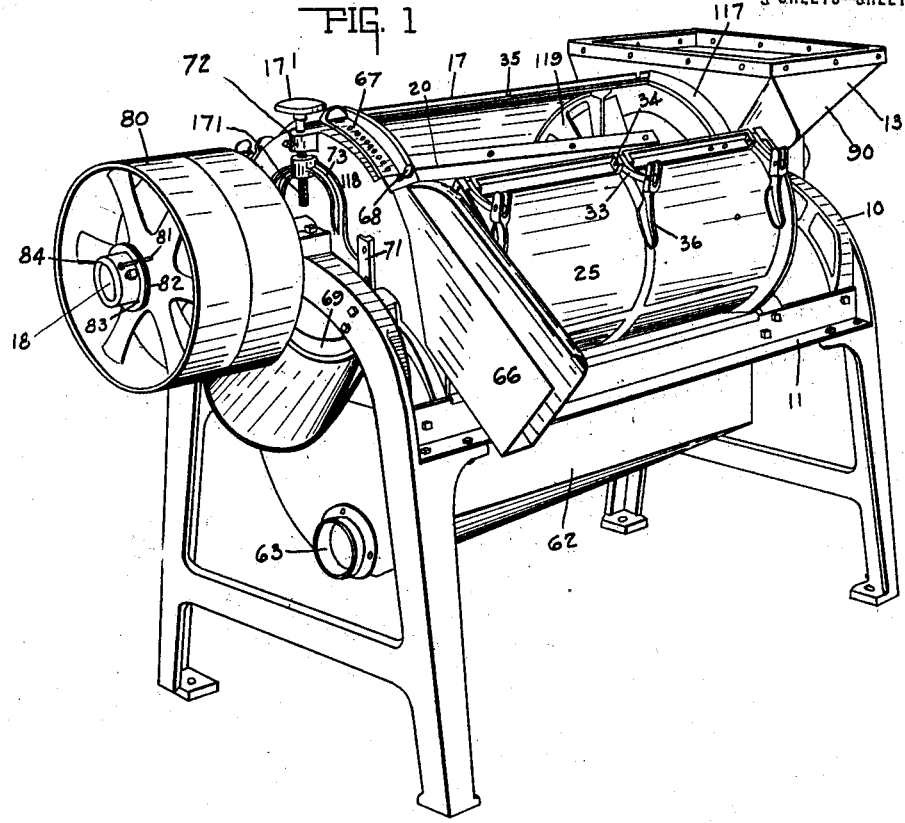
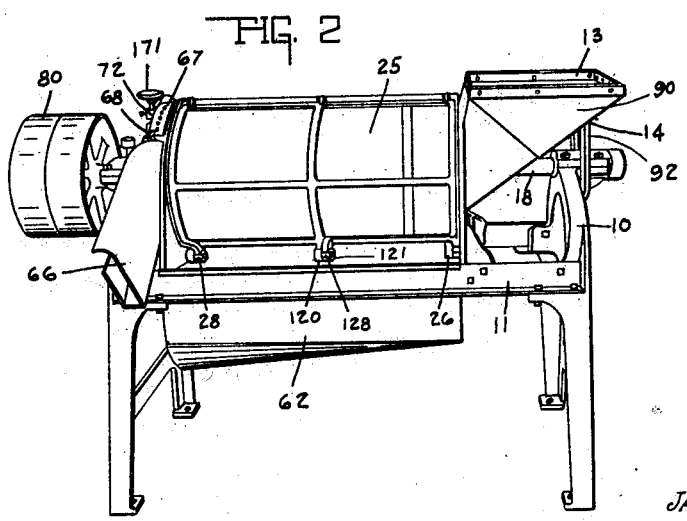
INVENTOR.
JAMES F. LINDLEY.
BY
Lockwood Lockwood
ATTORNEYS

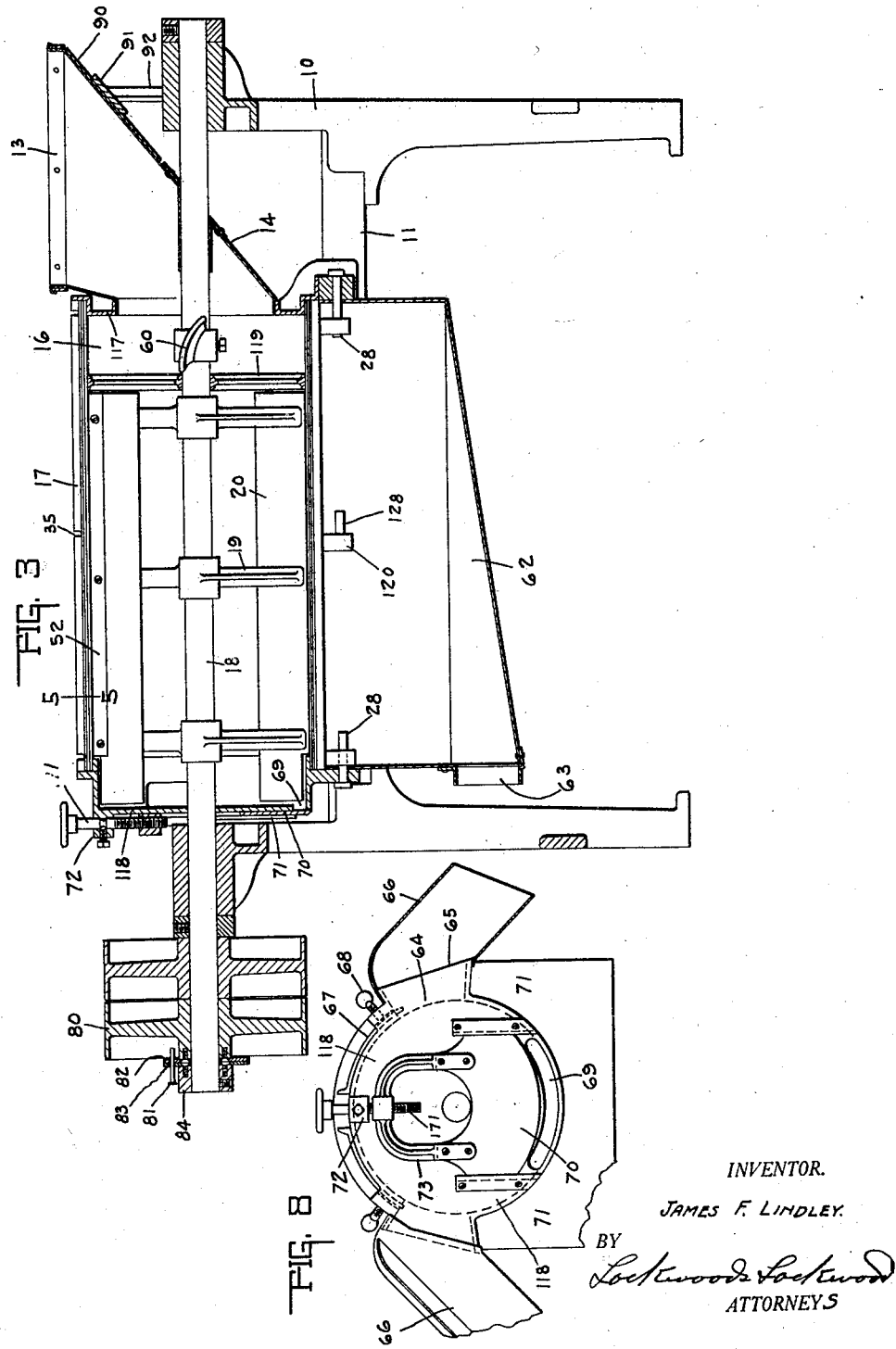

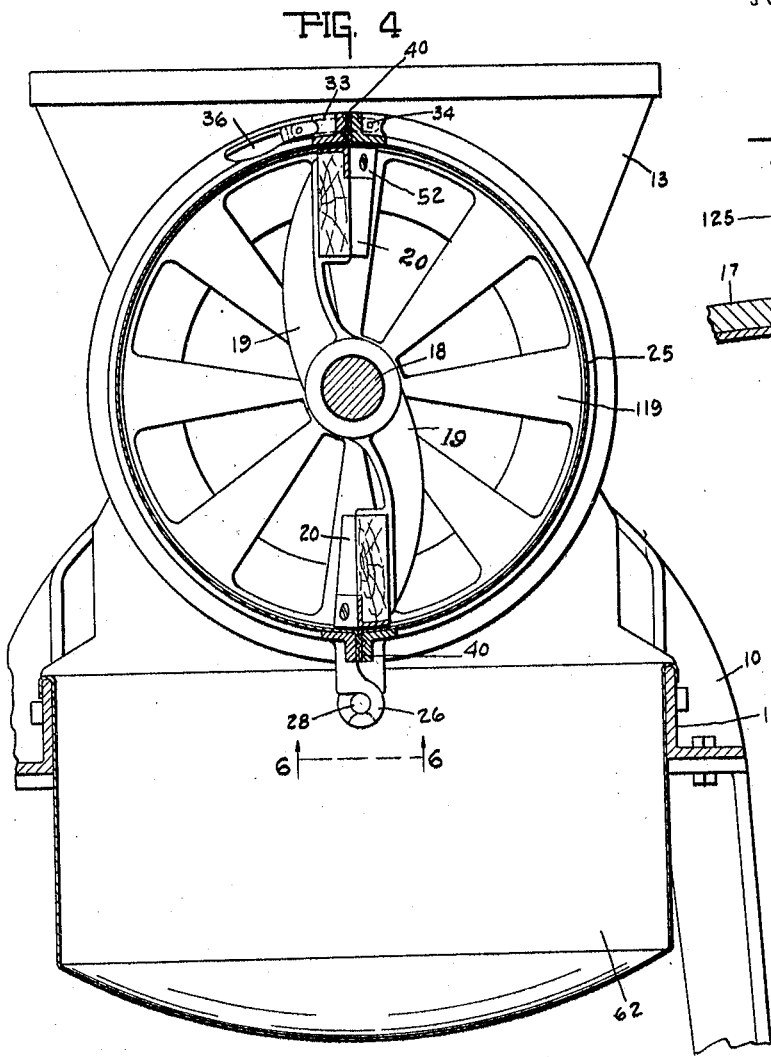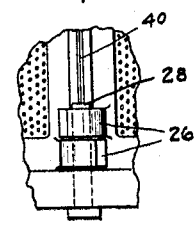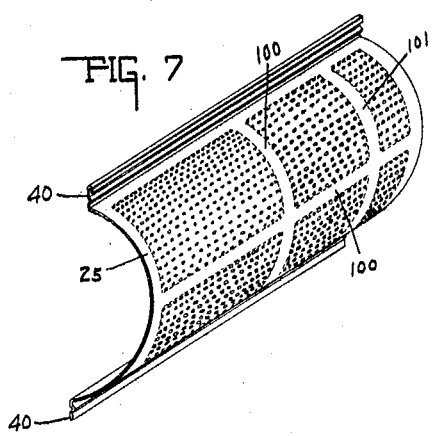

UNITED STATES PATENT OFFICE.

JAMES F. LINDLEY, OF INDIANAPOLIS, INDIANA, ASSIGNOR TO INDIANA CANNING MACHINERY COMPANY, OF INDIANAPOLIS, INDIANA, A CORPORATION.

PULPING MACHINE.

1,408,303.   Specification of Letters Patent.   Patented Feb. 28, 1922.

Application filed April 19, 1919. Serial No. 291,327.

*To all whom it may concern:*

Be it known that I, JAMES F. LINDLEY, a citizen of the United States, and a resident of Indianapolis, county of Marion, and State of Indiana, have invented a certain new and useful Pulping Machine; and I do hereby declare that the following is a full, clear, and exact description thereof, reference being had to the accompanying drawings, in which like numerals refer to like parts.

The object of this invention is to improve the construction and operation of pulping machines, that is, machines for treating tomatoes and like vegetables to adapt the same for canning.

One feature of the invention consists in so constructing the pulping cylinder of the machine, in which the tomatoes or the like are treated, that it will be in the form of two cylindrical halves hinged to the frame at the lower end and the sides adapted to fall back in each direction and thus open the cylinder so as to render its interior accessible and make it easily cleaned with water or a steam hose.

Another feature of the invention consists in forming the cylinders of frames with sectional screens loosely placed therein and held in position by being clamped between the frame members at the joints where they are secured together. Consequently when the pulping cylinder is opened, the screens can be relatively easily removed.

Another feature of the invention consists in the beaters being formed with metal faces or edges adjacent the cylinder wall for crushing the tomatoes and forcing them through the screen.

Another feature of the invention consists in the particular means for hinging the two cylinder sections together whereby they may be quickly separated.

Another feature of the invention consists in providing means for discharging waste and the like from the machine laterally thereof through suitable chutes. This gives ample room for placing and handling receptacles for the waste.

Another feature of the invention consists in means for regulating the end waste outlet so as to adapt it to the particular quality of material being treated at any one time.

Still another feature of the invention consists in the means for coupling the driving pulley with the beater shaft so that it will become disengaged and run idle if the beater is subject to unusual strain.

The full nature of the invention will be understood from the accompanying drawings and the following description and claims:

In the drawings, Fig. 1 is a perspective view of the pulping machine with the pulping cylinder open and the near side turned back. Fig. 2 is a side elevation of the machine. Fig. 3 is a central vertical longitudinal section through the machine. Fig. 4 is a vertical transverse section through the machine on an enlarged scale, parts being broken away. Fig. 5 is a section through a part of the cylinder on the line 5—5 of Fig. 3. Fig. 6 is a bottom view of a part viewed from the line 6—6 of Fig. 4. Fig. 7 is a perspective view of a screen. Fig. 8 is an elevation of the left-hand end of the cylinder, as shown in Fig. 3, parts being broken away.

The frame work of this machine is substantially old, it having end frames 10 with suitable legs and arched upper portions, and with side rails 11 in the form of angle bars. The machine also has a hopper 13 adapted to receive the tomatoes or other vegetables to be treated, and it has an inclined bottom 14 whereby the tomatoes will enter a feed chamber 16 of a pulping cylinder 17. There is a longitudinal driving shaft 18 carrying radial arms 19 which bear longitudinal beaters 20.

The cylinder is formed of end frames 117 and 118 and an open intermediate frame 119 and two semi-cylindrical side frames 17 with a semi-cylindrical screen 25 secured in each half of the cylinder frame. The semi-cylinder frames 17 are hinged together at their lower edges so as to be readily separable. Horizontal pins 28 extend from the end frames 117 and 118, and hook arms 26 from the cylinder frames 17 which hook over the pins in reverse directions, as shown. An arm 120 from one cylinder frame 17 is intermediate and has a pin 128 over which an arm 121 from the other cylinder frame hooks. This enables the latter frame member to be lifted out of place and then the other frame member 17 can be lifted out.

The frames of the cylinder sections are clamped together by the means shown in Fig. 1, namely, links 33 which are secured to one half of the frame at 34 and adapted to enter notches 35 in the upper edge of the other frame section and thin short clamping levers 36 are pivoted to the free ends of the links 33 between their ends so that one end of the hand lever 36 will engage the outside surface of the top bar of the frame 17 and when the lever is turned downward to the position shown in Fig. 4, it will clamp the two sections tightly together at the top of the cylinder.

The screens 25 for the cylinder are preferably formed as shown in Fig. 7. As observed there, there are unpunched areas 100 extending vertically and transversely of the screen and which lie against the cross bars of the skeleton frames 17. There is also an unpunched strip 101 which covers the periphery of the intermediate frame 119 in the cylinder. The margins are also unpunched and at the upper and lower edges there are outwardly extending flanges, as hereafter explained. This construction of screen makes it very strong and durable and capable of effectually resisting the terrible pressure to which it is subjected when the tomatoes are forced around by the beaters within the cylinder.

The screens 25, each semi-circular, have overlapping flanges 40 at their lower ends which have interfitting U-shaped ribs so that they are pressed and held together by the lower longitudinal edges of the sections 17, when they are brought together, as shown in Fig. 4. There are similar flanges 40 at the upper ends of the screens that are clamped between the upper longitudinal edges of the frame sections 17. In addition the upper edges of the screens at 125 are bent back into grooves in the edges of the cylinder frames 17, so as to hold the screens in place when the cylinder is opened up. With this construction the screens are easily put in place in the cylinder and they are readily removed for cleaning or replacement, if desired.

On the shaft 18 there are radial arms 19 extending in opposite directions to carry two longitudinal beater bars 20. These beater bars are made of wood and their edges adjacent the screens or cylinder walls are very liable to be worn out or "chawed," in the operation of the machine, whereby they do not satisfactorily treat or handle the tomatoes, as their edges wear away. Angle plates 52 are secured on the outer advancing edges of the beater bars with a sharp right angle in cross section which enables them to cut the vegetables and force them through the screens and prevent the wear which comes usually early with ordinary wood paddles. This enables the beaters to be worked as close to the screen at the end of the season as when it starts.

As has been stated, the tomatoes are fed by gravity from the hopper 13 to the feed chamber 16 and therefrom by the feed propellers 60 secured thereon.

Under the cylinder a drain pan 62 is provided which slopes from the front to the rear end of the machine and there is an outlet 63 at the rear end of the machine for discharging the material which passes through the screens.

The major portion of the waste is preferably discharged through the lateral openings 64, shown by dotted lines in Fig. 8. Said openings are surrounded by flaring walls 65 on which there is mounted a chute 66 that extends downwardly at an inclination and from which the waste is discharged in receptacles that can be easily replaced in proper position. The size of the openings 64 is adjusted by plates 67 slidably mounted on the end frame 118 of the cylinder and held in adjusted position by set screws 68.

There is a waste outlet opening 69 at the lower rear end of the cylinder, as seen in Fig. 8, for any waste that does not escape through the lateral waste outlets. This waste outlet 69 is controlled in size by a plate 70 slidably mounted in guideways 71 on the end plate 118 of the cylinder and is vertically adjusted by a screw 171 operating through a boss 72 on the end plate 118 in combination with a yoke 73 secured to the sliding plate 70.

The shaft 18 is driven by a pulley 80 which is mounted loosely thereon, but is coupled therewith by a shearing pin 81 passing through a hole in a plate 82 secured to the hub of the pulley and a plate 83 secured to a sleeve 84 which is fastened on the shaft. The purpose of this sort of connection is to enable the pin 81 to be sheared off in case there is unusual strain and thus enable the shaft propeller and beaters to stop at once. This is a protection against boulders or other foreign material that might be thrown into the pulper accidentally.

The hopper is preferably made of a thin sheet metal, such as copper or other non-corrosive material and it is usually too weak to withstand the impact of the vegetables that are thrown into the hopper. Therefore, the hopper is provided with a metal reinforcing plate 90 that envelops the upper portion of the back and sides, and it is still further reinforced by a cross bar 91 secured on standards 92 that are fastened to the frame at the right-hand end of the machine.

The invention claimed is:

1. A machine for pulping vegetables including a frame, a horizontal pin at each end of the frame, a cylinder formed of two semi-cylindrical halves adapted to be united at their upper and lower edges, hook arms extending from the lower edges adapted to hook over the pins for pivoting the cylinder sections thereto so that they may be readily removable when opened, and means for clamping the upper edges of the two cylinder sections together.

2. A machine for pulping vegetables including a frame, a horizontal pin at each end of the frame, a cylinder formed of two semi-cylindrical halves adapted to be united at their upper and lower edges, hook arms extending from the lower edges adapted to hook over the pins, an intermediate arm on the lower edge of each cylinder frame, said two arms being arranged so as to hook into each other, whereby the cylinder sections may be readily removed when opened, and means for clamping the upper edges of the two cylinder sections together.

3. A machine for pulping vegetables including a cylinder having a plurality of skeleton frames, and a screen for each of said skeleton frames, said screens being imperforated where they overlap and rest against the parts of said frames.

4. A machine for pulping vegetables including a cylinder formed of two semi-cylindrical frame sections hinged together at the bottom, a screen fitting on the inside of each of said frame sections with outwardly extending flanges around the edges thereof which overlap the edges of said frame sections, and means for clamping the upper edges of the frame sections together, whereby the flanges on the screens will be tightly clamped along the edges of the screens between the edges of said frame sections when they are closed and be readily removable when the cylinder is opened.

5. A machine for pulping vegetables including a cylinder having two semi-cylindrical frame sections hinged together at the bottom and with the adjacent faces of said frame sections having irregular surfaces, a screen fitting inside of each of said frame sections with outwardly extending flanges overlapping and irregularly formed to conform to the irregular surfaces of the adjacent faces of said frame sections, and means for clamping the upper edges of the frame sections together, whereby the edges of the screens will be firmly secured between the edges of the frame sections when they are closed and readily removable when the cylinder is opened.

6. A machine for pulping vegetables including a cylinder having two semi-cylindrical frame sections hinged together at the bottom and having corresponding ribs and recesses in the adjacent faces thereof, a screen fitting in each frame section having outwardly extending flanges which overlap the faces of the edges of said frame sections and conform to the ribs and recesses therein, and means for clamping the upper edges of said frame sections together whereby the screens will be securely held in place when the cylinder is closed and be readily removable when the cylinder is opened.

7. A machine for pulping vegetables including a cylinder having two semi-cylindrical frame sections hinged together at the bottom and having corresponding conformations of the adjacent faces of the edges, the upper edges having longitudinal recesses and grooves in their outer surfaces, a screen for and in each frame section having outwardly extending flanges which overlap the faces of the edges of said frame sections and the top edge of said screen being turned laterally back so as to fit in said recess and groove and thereby hold the screen in place when the cylinder sections are opened, and means for clamping the upper edges of said frame sections together for holding the screens securely in place between them.

8. A machine for pulping vegetables including a frame, a cylinder having lateral openings and a bottom at the discharge end thereof, a slidable plate arranged to control the size of each of said lateral and bottom openings, means for holding said plates in adjusted position, and a heater in said cylinder.

In witness whereof, I have hereunto affixed my signature.

JAMES F. LINDLEY.